2,898,229

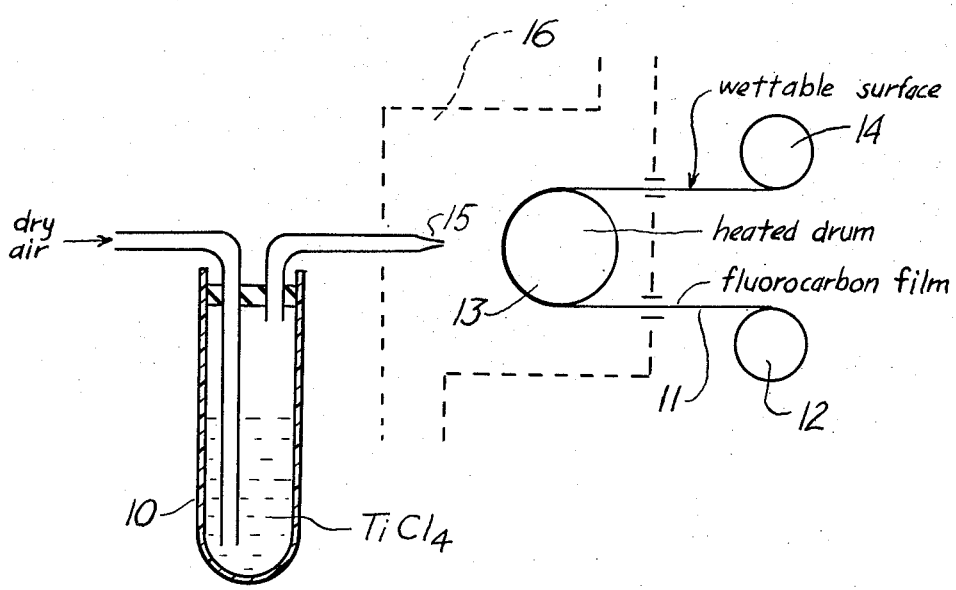

PROCESS FOR COATING FLUORINATED POLYMER SURFACES AND RESULTANT PRODUCT

Robert Herr, St. Paul, and Warren R. Beck, Mahtomedi, Minn., assignors to Minnesota Mining and Manufacturing Company, St. Paul, Minn., a corporation of Delaware Application March 31, 1958, Serial No. 725,310

7 Claims. (Cl. 117—47)

This invention relates to the surface treatment of fluorocarbon polymers, and has particular reference to treatments for improving the wettability, handling characteristics, and other properties of films of polymers of highly fluorinated monomers such as tetrafluoroethylene, chlorotrifluoroethylene, perfluoropropylene and the like.

Polytetrafluoroethylene films, and other polymeric films having high fluorine content fluorocarbon surfaces, are notoriously slippery to the touch and difficult to wet with inks, resins, adhesives and the like. The present invention provides a means of overcoming these and other deficiencies. It provides treated films which in the form of strips or tapes can be firmly gripped and held without slippage, for hand-winding around shafts, coils, and other articles. It provides wettable film surfaces over which inks, resins and other pastes or solutions may be smoothly spread and to which the dried or cured residues thereof will remain adherently attached. Both permanently and temporarily tacky resinous or rubbery adhesive compositions will adhere to these treated surfaces with much greater force than to the untreated polymer, with the result that the treated films are useful as backings for pressure-sensitive adhesive tapes, as coverings for lead-in wires or cables of resin-encapsulated electrical circuit components, as spot insulation to be applied to restricted areas of metal panels, and for a wide variety of other analogous applications.

The surfaces of polytetrafluoroethylene and analogous films are not only notoriously slippery to the touch and resistant to wetting, but are also chemically highly inert and of surprisingly high softening temperature. The present invention provides for the activation of such surfaces, as noted above, by procedures which involve neither fusion nor chemical reaction of said surfaces, and which cause no deterioration or degradation whatever of the bulk properties of the original film.

One method of practicing the invention will now be described in connection with the appended drawing. Dry air, from a source not shown, is bubbled through titanium tetrachloride in flask 10 and the resulting vapor is impinged against the surface of a strip of polytetrafluoroethylene film 11 while the latter is drawn from supply roll 12, around heated support roll 13, and to storage roll 14. The nozzle 15 and support roll 13 may be contained within an oven or other isolating chamber 16 if desired, any such chamber being provided with inlet and outlet ports as indicated. The opening of the nozzle 15 is preferably in the form of an extended slot so that the concentration of vapor is substantially uniform across the width of the strip 11.

In a specific example, the roll 13 is maintained at a temperature and speed of rotation sufficient to bring the exposed surface of the thin polytetrafluoroethylene film to a temperature of at least about 150° C. as it passes the nozzle 15, and the flow of compressed air, and therefore of $TiCl_4$ vapor, is maintained just sufficient to produce the desired surface effect.

Temperatures of at least about 150° C. are required to produce a useful degree of wettability. Higher temperatures, up to the sintering temperature of the fluorocarbon film, are still more effective. Polytetrafluoroethylene, for example, has a sintering temperature of about 325–330° C.; and this film is preferably treated with the $TiCl_4$ vapor at temperatures in the neighborhood of 250–300° C. to obtain maximum surface wettability without distortion of the film. Still higher temperatures are useful where distortion is no problem, e.g. in treating the surface of a polytetrafluoroethylene insulating covering on a conductive wire or cable. Since slight deterioration of polytetrafluoroethylene may occur on prolonged heating at or near sintering temperatures, the time and temperature of heating is so controlled as to avoid any significant deterioration of the polymer.

Presumably the $TiCl_4$ reacts with moisture present at the film surface or in the air surrounding or subsequently contacting the surface, with the formation of $TiO_2$. For this purpose, the moisture normally present in the air, even at as low a relative humidity as 10–20%, is found to be adequate; and the oven 16 is accordingly provided with entry and exit ports sufficient to permit a gentle flow of air therethrough. Surprisingly, the liberated $TiO_2$ is firmly bonded to the surface of the polytetrafluoroethylene film even though the latter would be expected to be completely free of moisture at the time of contact, due to the previous heating of the film to an elevated temperature far in excess of the boiling point of water; and due also to the known low capacity of the polytetrafluoroethylene polymer for dissolved water.

The roll 13 may be heated in any convenient way, either by high pressure steam or other heated fluids, or by internal electric heating, or in other ways. Alternatively, the roll 13 may be eliminated and the film 11 either drawn continously through the chamber 16 or, where smaller segments are to be treated, merely suspended in the chamber, the latter in such cases being heated by steam coils, electric resistance coils, radiant heaters or in other ways. Either or both of the major surfaces of the polymeric film may be treated, as desired.

Moderate spacing between the tip of the nozzle 15 and the adjacent surface of the film 11 is ordinarily found desirable, and further indicates that reaction must occur between the $TiCl_4$ and the moisture of the surrounding atmosphere. This dimension is subject to considerable variation, depending, for example, on such variables as moisture content of the air, rate of development of the activated film surface, and composition of the reactant vapor. The concentration of $TiCl_4$ may be controlled by diluting with $CCl_4$ or other inert diluent, by the use of carrier gases other than air, or in other ways; or the $TiCl_4$ or solution thereof may be held at more or less elevated temperatures.

Polytetrafluoroethylene film, as well as other equivalent fluorocarbon film, when treated as above-described is found to be free of the usual surface slipperiness and can be handled, as in the hand wrapping of various articles, without undue slippage. Pressure-sensitive adhesive tapes adhere firmly to the treated film surface, whereas they are easily stripped from the untreated film. Thus the removal effort required to strip such tape from untreated polytetrafluoroethylene film is not more than 5 oz./½ inch width, whereas a removal effort of the order of 12–16 ozs./½ inch width or higher is required in the case of the film treated with $TiCl_4$ as above-described. At least an equivalent difference is observed with epoxy resin encapsulating compositions which have been cured in contact with the treated and the untreated film surfaces. Substantially the same results as are shown hereinbefore in the case of titanium tetrachloride treatment are obtainable with germanium tetrachloride and also with silicon tetrachloride, the reactions in the case of these compounds being presumably essentially the same as in the case of the TiCl₄, and resulting in the deposition on, and bonding to, the polymer surface of the respective oxide product. Tetra isopropyl titanate is another example of a volatile readily hydrolyzed compound of a member of the group of silicon, titanium and germanium which has been similarly employed in producing the surface-activated fluorocarbon articles of the present invention, although with somewhat less effectiveness in terms of speed of treatment.

In the foregoing examples, the polytetrafluoroethylene film employed is a dense non-porous pre-fused film. Similar results are also obtainable with clean porous unfused extruded films, e.g. of polytetrafluoroethylene, which preferably are held at a temperature substantially above 150° C. but below the sintering temperature of the film material during contact with the treating vapor. Following the treatment, the porous film is then further heated to a temperature just above the sintering temperature, viz. to about 330–350° C., to permit it to fuse or sinter into the desired dense and non-porous form, and is then preferably rapidly cooled, as by quenching. A preferred procedure involves the application of the TiCl₄ or equivalent vapor to the surface of the film as the latter is being heated to the sintering temperature in an oven and at the point at which the initially opaque fibrous film first becomes clear and semi-transparent but before it begins to shrink. Brief further heating then causes the film to shrink into a dense, non-porous, fully sintered form, after which it is quenched in water. The surface treatment remains effective even under these extreme conditions, the resulting film being free of extensive slipperiness, and receptive toward adhesives and resins.

The wettable films obtained by these methods are fully equal in electrical and physical properties, e.g. dielectric strength, tensile strength, etc., to the initial fluorocarbon films, or films made by the same techniques, but wtihout the surface treatment with TiCl₄ or equivalent. In addition, the films of this invention are readily wet by adhesives, resins, inks and the like as hereinbefore noted, and are substantially free of surface slipperiness. The same results are obtained with fluorocarbons in forms other than thin films; for example, fluorocarbon tubes, rods, filaments, jackets for wires, and various other structures or articles of fluorocarbon polymers or having equivalent fluorocarbon surface characteristics are provided with readily wettable surfaces of reduced slipperiness, and without any degradation of the bulk properties, by procedures as herein described.

What is claimed is as follows:

1. Process for activating an initially slippery fluorocarbon polymer surface to render the same wettable by inks, resins and adhesives, comprising heating said surface without significant deterioration of said polymer to at least about 150° C., and contacting the heated surface with the vapor of a volatile and readily hydrolyzable compound of an element of the class consisting of silicon, titanium and germanium, in the presence of moisture.

2. Process for activating an initially slippery fluorocarbon polymer surface to render the same wettable by inks, resins and adhesives, comprising heating said surface to at least about 150° C. and below the sintering temperature of said polymer, and contacting the heated surface with titanium tetrachloride vapor in the presence of moisture.

3. Process for activating a polytetrafluoroethylene polymer surface to render the same wettable by inks, resins and adhesives, comprising heating said surface to at least about 150° C. and below the sintering temperature of said polymer, and contacting the heated surface with titanium tetrachloride vapor in the presence of moisture.

4. Process for rendering a thin polytetrafluoroethylene film wettable by inks, resins and adhesives, comprising heating said film to a temperature just below its sintering temperature and contacting the heated surface with titanium tetrachloride vapor in the presence of moisture.

5. Process for producing a thin dense polytetrafluoroethylene film having a surface wettable by inks, resins and adhesives, comprising heating an opaque thin porous fibrous unsintered polytetrafluoroethylene web to a temperature in the neighborhood of the sintering temperature and at which the web first approaches transparency, exposing the thus heated film to titanium tetrachloride vapor in the presence of moisture, further heating the treated film to sintering temperature, and quenching the resulting dense non-porous sintered film.

6. A fluorocarbon polymer article having a wettable surface produced in accordance with the process of claim 1.

7. A thin polytetrafluoroethylene film, having a surface wettable by inks, resins and adhesives, produced in accordance with the process of claim 4.

References Cited in the file of this patent

UNITED STATES PATENTS 2,689,805   Croze _____ Sept. 21, 1954